Figure 1:
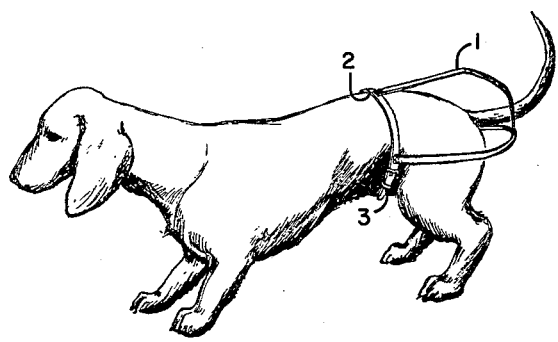

Oct. 22, 1963  C. L. GODDARD, JR  3,107,653
DEVICE FOR THE PREVENTION OF CONCEPTION IN A FEMALE ANIMAL
Filed Oct. 16, 1961

*INVENTOR.*
Chester Lee Goddard Jr.
BY

United States Patent Office 3,107,653
Patented Oct. 22, 1963

3,107,653
DEVICE FOR THE PREVENTION OF CONCEPTION
IN A FEMALE ANIMAL
Chester L. Goddard, Jr., Rte. 1, Box 547G,
Valley Center, Calif.
Filed Oct. 16, 1961, Ser. No. 145,045
1 Claim. (Cl. 119—143)

This invention concerns a device for the prevention of conception in a female animal. The term "animal" as hereinafter used applies generally to any and all sub-human species, particularly quadripeds, and specifically excludes human beings. Stated otherwise, the practice of this invention is limited to the lower animals, and more particularly to those having an economic or other value which may be enhanced by selective breeding.

As is well known, the value of many animals (as above defined) is determined, or greatly influenced by, the care exercised in selecting the progenitors thereof to the end that a pure strain or other desired characteristic is maintained or accentuated in the offspring. For example, by such selective breeding the offspring may be particularly resistant to a disease, may be more effective as meat-producers or milk-producers, or may be better able to survive under adverse environments, or may continue a pure blood line of recognized desirable characteristics. To this end several societies have organized for the perpetuation of pure-bred or pedigree animals as, for example, the American Kennel Club.

Accomplishment of this desirable form of selective breeding requires not only that a mating occur between the selected male and female animals, but that breeding of the female with any other male animal must be absolutely precluded. It is therefore a principal object of this invention to provide a means for the prevention of conception in the female animal by precluding its breeding with another, and presumably undesirable, male animal.

It is a further object of this invention to accomplish this principal object with a minimum interference with any other activities of the female animal.

It is a further object of this invention to provide such a device which may be readily attached, and, when no longer required at the end of the period of potential conception, or "heat," may be readily detached.

It is a further object of this invention to provide a device of the type described which can be easily cleaned and maintained in a sanitary condition.

It is a further object of this invention to provide a means for accomplishing these desirable results with greater economy as, for example, in minimizing the expenses of fencing and cross-fencing in a group of male and female animals, as in a dairy herd, by permitting the group to associate freely until the most opportune moment for selective breeding.

The present invention is described, for illustrative purposes only, as applied to a female canine but it is intended for application generally to any female animal for which selective breeding is economically or otherwise desirable, as above recited.

In the drawings, FIGURE 1 illustrates the subject invention as applied to a female animal, and, as illustrated, a female canine.

Figure 2:
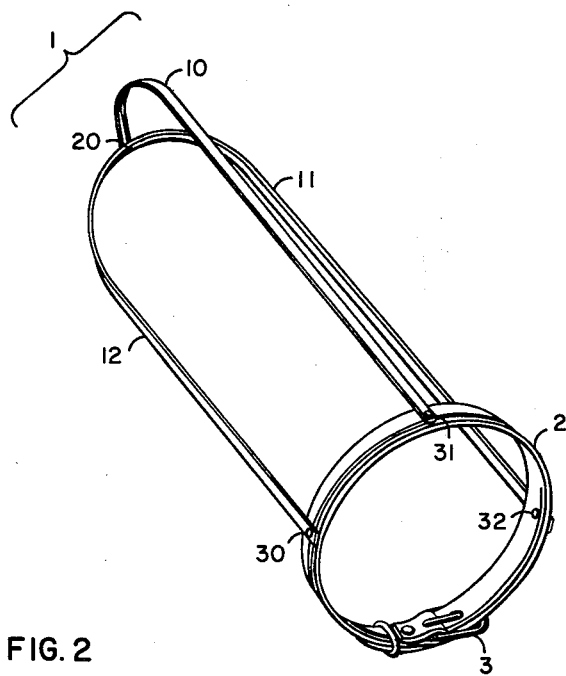

FIGURE 2 illustrates a preferred practical embodiment of this invention, as more fully described below being an enlarged view thereof.

Referring now to FIGURE 1, the device comprises a rearwardly protruding object 1 (more fully described in connection with FIGURE 2) and means for attaching same to the female animal as by a flexible collar or belt 2, the latter being provided with a means for easy attachment and detachment, such as a buckle 3. Collar 2 and attaching means 3 may typically take the form of a dog collar, in which collar 2 is fabricated of some resilient material such as leather, plastic or the like, with buckle 3 appropriately adapted, as from metal, hard plastic or the like.

FIGURE 2 more fully details the subject invention, in which collar 2 and attaching means (buckle 3) are repeated. Object 1 is more fully illustrated as comprising several members 10, 11, and 12 (three such being illustrated, although a greater number may be employed if desired in keeping with the practice of my invention) attached at a common terminus as, for example, by means of rivet 20, which common terminus forms the rearmost portion of the device when used as intended. The several members 10, 11, and 12 are permanently affixed to collar 3, for example, by means of rivets 30, 31, and 32. Members 10, 11, and 12 are preferably fabricated from some light-weight, durable, and relatively strong material, such as aluminum strip.

The distance between the attaching collar 3 and the rearmost portion in the vicinity of rivet 20 is adapted, according to the size and species of the female animal, to so interfere with the activities of an undesirable male as to preclude successful sexual contact and prevent conception by the female animal. The sideways separation, and the number, of the members 10, 11, 12, etc. is likewise adapted for the purposes intended by appropriate adjustment in accordance with the size and species of the female animal.

The open-type structure illustrated provides a minimum interference with any other activities of the female animal, such as sleeping, running, tail-wagging etc., can be readily detached when no longer required, and is inherently sanitary. The last named feature is in contrast to a number of devices of "diaper" construction which are necessarily unsanitary unless frequently replaced. The device can furthermore be maintained in a sanitary condition with a minimum of effort.

I claim:
A device for the prevention of conception in a female animal, comprising, in cooperative relationship, an object protruding rearwardly from said animal and adapted to preclude sexual contact with said female animal, and optionally detachable means for attaching the object with the animal, said rearwardly protruding object comprising a plurality of members in spaced cooperative relationship each separately affixed to the attaching means and all meeting at a common rearward terminus, said members being fabricated of relatively high-strength and low weight material including aluminum, whereby interference with other animal activities is minimized.

References Cited in the file of this patent
FOREIGN PATENTS
19,094   Great Britain _____ Oct. 29, 1903